(12) United States Patent
Park

(10) Patent No.: US 6,661,304 B2
(45) Date of Patent: Dec. 9, 2003

(54) APPARATUS FOR REDUCING ELECTRONIC WAVE BY USING ELECTRONIC WAVE AS ENERGY SOURCE

(76) Inventor: Chunseak Park, #111, 62-1, Bundang-dong, Bundang-gu, Seongnam-city, Kyonggi-do (KR), 463-030

( * ) Notice: Subject to any disclaimer, the term of this patent is extended or adjusted under 35 U.S.C. 154(b) by 38 days.

(21) Appl. No.: 10/103,735

(22) Filed: Mar. 25, 2002

(65) Prior Publication Data

US 2003/0169122 A1 Sep. 11, 2003

(30) Foreign Application Priority Data

Mar. 11, 2002 (KR) ........................................ 2002-12920

(51) Int. Cl.[7] ................................................ H04B 3/28
(52) U.S. Cl. ...................................................... 333/12
(58) Field of Search ................................ 333/12, 18 R, 333/185; 331/78

(56) References Cited

U.S. PATENT DOCUMENTS 4,255,782 A * 3/1981 Joyce ............................. 363/8
4,724,390 A * 2/1988 Rauscher et al. ........... 324/344
5,343,120 A * 8/1994 Mulieri ......................... 315/58
6,014,063 A * 1/2000 Liu et al.
6,043,994 A * 3/2000 Keller ........................... 363/19

* cited by examiner

Primary Examiner—Patricia Nguyen

(57) ABSTRACT

The present invention discloses an apparatus for reducing an electronic wave by using the electronic wave as an energy source which can efficiently consume the electronic wave generated in electric and electronic circuits, by rectifying the electronic wave received in a screening unit having different conductivity, converting the rectified electronic wave into a direct current power source, and converting the electric energy into a heat or kinetic energy. The apparatus for reducing the electronic wave includes: a screening unit for screening the electronic wave; a rectifying unit for converting a ripple into a direct current; an accumulating unit for accumulating the rectified current, and a consuming unit for consuming the accumulated energy. The consuming unit converts the electric energy into the heat or kinetic energy, reduces the electronic wave and consumes the current. Accordingly, a circuit with a periodicity and high energy level is generally operated by a high-energy source, the apparatus is efficient to screen and remove the electronic wave.

3 Claims, 3 Drawing Sheets

PRIOR ART

APPARATUS FOR REDUCING ELECTRONIC WAVE BY USING ELECTRONIC WAVE AS ENERGY SOURCE

TECHNICAL FIELD

The present invention relates to an apparatus for reducing an electronic wave by using the electronic wave as an energy source, and in particular to an improved apparatus for reducing an electronic wave which can efficiently consume the electronic wave by removing the electronic wave by screening and rectifying the electronic wave, and using the electronic wave as an energy source of a circuit.

BACKGROUND ART

As a conventional apparatus for reducing an electronic wave, a filter or screening material has been used for a portable product which cannot be grounded, and an apparatus for reducing an electronic wave by grounding has been used for a product installed on a table or bottom. A general apparatus for screening an electronic wave has been disclosed in Patent Publication No. 2001-0069861, which will now be explained with reference to FIGS. 1 and 2.

FIG. 1 is a plan view illustrating the conventional apparatus for screening the electronic wave for a cellular phone. The apparatus includes an LED 3 positioned at the center portion of an elliptical substrate 2, for emitting light due to external energy such as the electronic wave; copper wires 4 and 4-1 connected to the LED 3 and positioned at tile right and left sides thereof, for inducing and attenuating the electronic wave; and a thin copper plate connected to the end portion of the copper wire 4-1, externally protruded and easily bent by fingers. Here, the copper wires 4 and 4-1 are formed on the identical space with a wide surface area, for absorbing relatively much electronic wave.

In more detail, FIG. 2 is a schematic view illustrating an internal structure of the apparatus for screening the electronic wave for the cellular phone. An adhesion layer 6 is formed below the substrate 2, and a copper wire protection layer 8 is formed at the outer portion of the substrate 2. That is, the LED 3 and the copper wires 4 and 4-1 are surrounded by the copper wire protection layer 8 to be protected from an external impact or contact. The screening apparatus 1 can be adhered to an electronic wave generating area by the adhesion layer 6. In addition, the adhesion layer 6 is composed of an adhesive material which has a sufficient adhesive strength not to be easily separated due to an external force and which can be taken off and re-adhered.

However, the conventional apparatus for screening the electronic wave has a disadvantage in that special measures are required for all components or circuits generating the electronic wave in an apparatus using measure components including a filter. A method for reducing the electronic wave by grounding is excessively dependent upon design of the PCB to the extent that to use a capacitor is determined according to stability or width of the grounding. As a result, general users who do not have many design experiences or know well of the electronic wave succeed in finding causes and solutions after many trials and errors.

In addition, a number of components and spaces cause many expenses and reduce a component mounting area.

The conventional apparatus for screening the electronic wave by using the screening material spreads or paints the screening material on an electronic wave generating area of an electronic product by blasting. However, when various cables or metal components contact the surface of the screening material, the screening material is operated as an antenna for re-radiating the electronic wave (second radiation) or reducing resistance to the electronic wave.

Moreover, the conventional apparatus for screening the electronic wave is used for a portable product such as the cellular phone, PDA or MP3 player. When such a portable product is impacted or re-assembled for repairs, the screening function may be removed or deteriorated.

The conventional apparatus for screening the electronic wave directly consumes the electronic wave generally generated in the electric product by using a hand-operated component. Thus, the hand-operated component must be connected to all components or signal lines. To remove the electronic wave by the grounding or screening material reduces reproducibility. Accordingly, when the portable product has vibration or is carried by the user, its performance is reduced.

SUMMARY OF THE INVENTION

It is, therefore, an object of the present invention to provide an apparatus for reducing an electronic wave which can remove radiation causes of the electronic wave in a movement path, which can be applied to a small-sized portable product or a special area generating a high electronic wave, which can simplify the whole structure, and which can make a user not to care for all signal lines, by using the electronic wave obtained by partially or wholly screening an electronic system as an energy source, and consuming the electronic wave generated in a circuit in the most adjacent area.

To achieve the above object, there is provided an apparatus for reducing an electronic wave by using the electronic wave as an energy source, including: a screening unit for screening the electronic wave; a rectifying unit for converting a ripple of the electronic wave screened by the screening unit into a direct current; and a consuming unit for converting the direct current electric energy rectified by the rectifying unit into a heat or kinetic energy, and consuming the heat or kinetic energy, a plurality of conductive materials having different conductivity, such as gold or gold-plated plates, silver or silver-plated plates, lead or lead-plated plates, and aluminum or aluminum-plated plates being connected in parallel to compose the screening unit.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
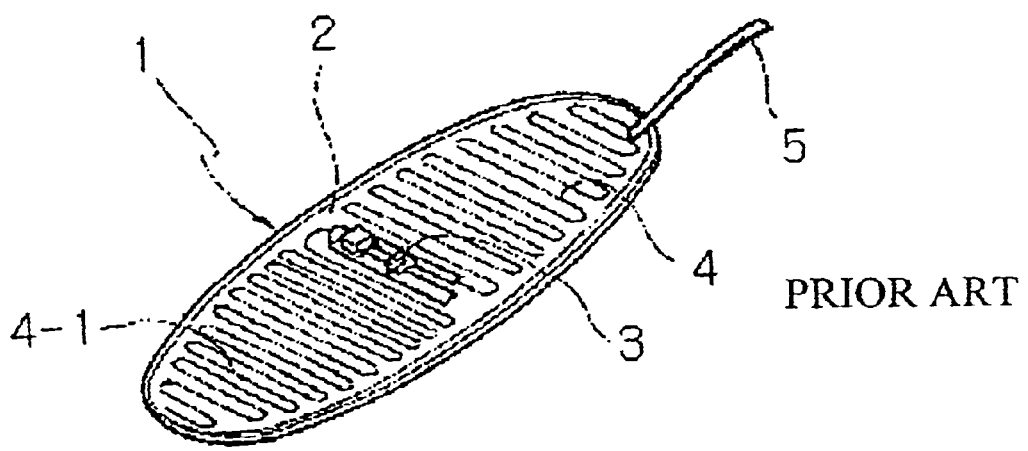
FIG. 1 is a plan view illustrating a conventional apparatus for screening an electronic wave for a cellular phone.
Figure 2:
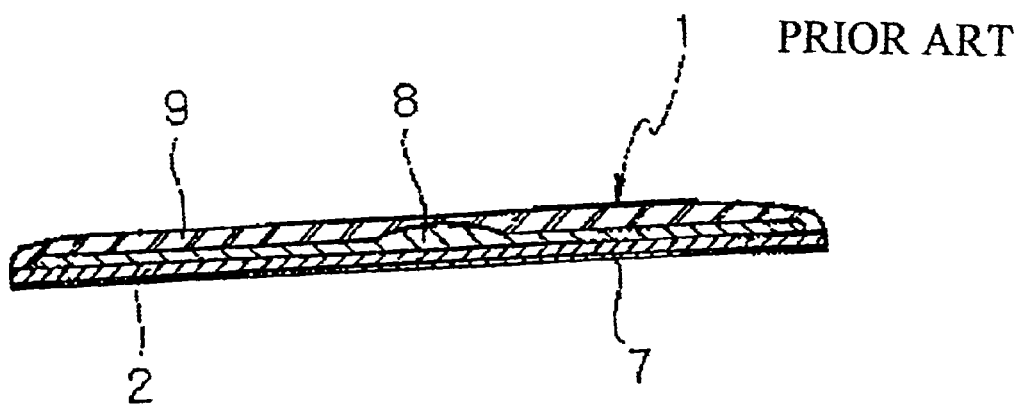
FIG. 2 is a schematic view illustrating an internal structure of the conventional apparatus for screening the electronic wave for the cellular phone.

A preferred embodiment of the present invention will now be described with reference to the accompanying drawings.

In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
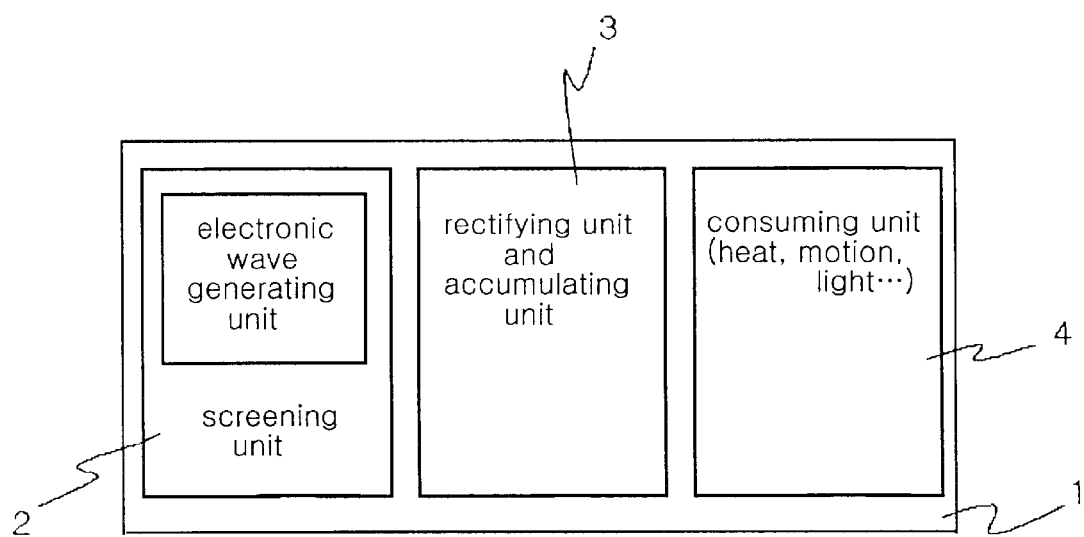
FIG. 3 is a block view illustrating an apparatus for reducing an electronic wave by using the electronic wave as an energy source in accordance with a preferred embodiment of the present invention.

FIG. 3 is a block view illustrating an apparatus for reducing an electronic wave by using the electronic wave as an energy source in accordance with a preferred embodiment of the present invention.

The apparatus for reducing an electronic wave 1 for reducing the electronic wave by using the electronic wave as the energy source includes a screening unit 2; a rectifying unit and an accumulating unit 3; and a consuming unit 4.

The screening unit 2 connects at least two kinds of conductive materials which have different conductivity in series or parallel, and employs the power source rectified by the electronic wave as an electromotive force for generating the Peltier effect. The thusly-generated heat and absorbed heat are consumed by a radiation fin or in the air.

The rectifying unit and accumulating unit 3 include a diode for detecting the induced electronic wave, and a driving material connected to both ends of the diode and operated due to potential difference of the ends, for easily consuming a current of the consuming unit 4. In addition, the rectifying unit may use a plurality of circuits where at least two kinds of conductive materials having different conductivity are connected in series or parallel.

The consuming unit 4 serves to reduce the electronic wave and consume the accumulated current by converting an electric energy into a heat or kinetic energy. Since a circuit with a periodicity and high energy level is generally operated by a high energy source, the consuming unit 4 is efficiently used in an electronic circuit.

Figure 4:
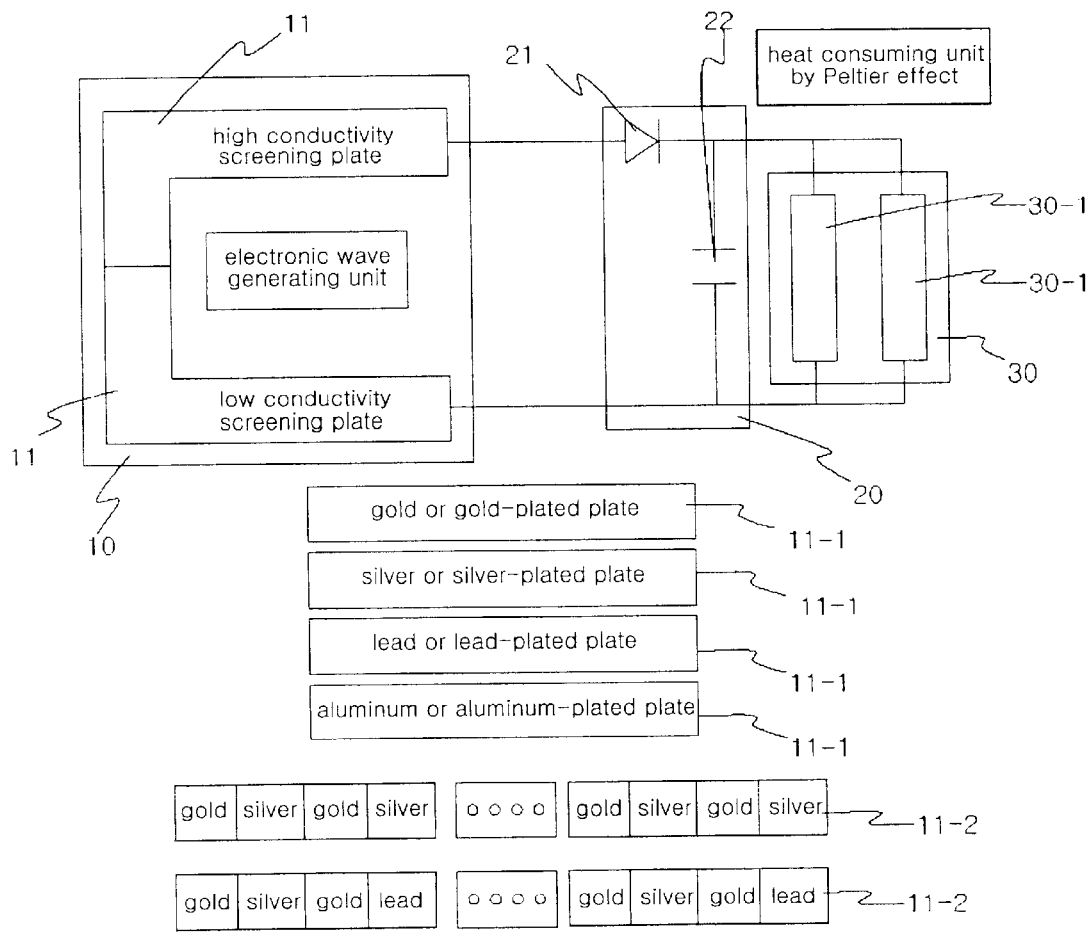
FIG. 4 is a circuit view illustrating the apparatus for reducing the electronic wave by using the electronic wave as the energy source in accordance with the preferred embodiment of the present invention.

FIG. 4 is a circuit view illustrating the apparatus for reducing the electronic wave by using the electronic wave as the energy source in accordance with the preferred embodiment of the present invention.

The apparatus for reducing the electronic wave by using the electronic wave as the energy source includes a screening unit 10 for receiving the electronic wave generated in an electric product; a rectifying unit 20 for rectifying the electronic wave from the screening unit 10; and a consuming unit 30 for consuming a power source by using the current induced by the rectifying unit 20.

The screening unit 10 is composed of a conductive material for receiving, absorbing and screening the electronic wave generated in the electric product, which is a kind of electronic wave reception antenna. Here, the screening unit 10 is adhered adjacently to an area of the electric product where the electronic wave is seriously generated, and wire or wireless-connected to an electronic wave generating unit on a circuit. In the screening unit 10, a plurality of conductive materials 11-1 and 11-2 having different conductivity are connected in parallel. The conductive materials 11-1 and 11-2 are composed of materials of high conductivity difference such as gold and lead, and gold and silver. When the conductive materials are not different in conductivity, in order to increase difference in conserved electric charge quantity between the screening materials, an inductor or ferrite bead is employed to increase potential difference or noise potential difference. In addition, a plurality of conductors connected to the screening unit 10 can be connected in series or parallel to at least two kinds of conductive materials 11-1 and 11-2 having different conductivity.

On the other hand, the rectifying unit 20 rectifies the electronic wave absorbed by the screening unit 10, and transfers the rectified electronic wave to the consuming unit 30, and includes a rectifying diode 21 for rectifying a ripple of the electronic wave screened by the screening unit 10, and a capacitor 22 for increasing potential difference. The conductor connected to the rectifying unit 20 is connected in series to at least two kinds of conductive materials having different conductivity.

Since the rectifying unit 20 is positioned at the higher or lower conductivity area, it can be used when a high electronic wave generating area is not detected.

The screening unit 10 and the rectifying unit 20 are formed in a wide plate type to easily screen and absorb the electronic wave. Here, copper and gold are connected in series to compose the screening unit 10. The rectifying unit 20 rectifies the electronic wave generated in the screening unit 10 by using the rectifying diode 21, and transfers the rectified electronic wave to the consuming unit 30. The screening unit 10 and the rectifying unit 20 are spread with a conductive material by deposition or blasting, and are used as screening and rectifying electrodes.

The consuming unit 30 is positioned at both ends of the capacitor 22 for consuming the direct current power, and includes a variety of hand-operated devices such as resistors, inductors, motors, LEDS and electromagnets. The rectifying unit 20 is adjacent to the consuming unit 30, thereby achieving rectifying and consuming effects at the same time.

The operation of the apparatus for reducing the electronic wave in accordance with the present invention will now be explained, centering round the screening unit 10, the rectifying unit 20 and the consuming unit 30.

Referring to FIG. 4, when at least two kinds of conductive materials are connected in series 11-1 or parallel 11-2, the screening unit 10 screens the current. Therefore, the ripple which is the screened electronic wave is generated and transferred to the rectifying unit 20, inputted to the rectifying diode 21 and the capacitor 22 of the rectifying unit 20, converted into the direct current and accumulated. Thereafter, the electric energy of the direct current is converted into the heat or kinetic energy by using the hand-operated devices 13-1 of the consuming unit 30, namely the resistors, inductors, motors, LEDS and electromagnets, thereby reducing the electronic wave and consuming the accumulated current.

As discussed earlier, in accordance with the present invention, the apparatus for reducing the electronic wave is suitable for the electronic product which is hardly grounded or which has a deficient component mounting space, and easily applied to a small-sized cellular phone or a specific area generating a high electronic wave. Moreover, the apparatus simplifies the whole structure and makes the user not to care for all signal lines. Since the circuit with a periodicity and high energy level is generally operated by a high-energy source, the apparatus is useful to screen and remove the electronic wave. Accordingly, the present invention is very efficient for an electronic circuit industry.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for reducing an electronic wave by using the electronic wave as an energy source, comprising:

a screening unit for screening a current by connecting a plurality of conductive materials having different conductivity in parallel, and using material quality of high conductivity difference;

a rectifying unit including a rectifying diode and a capacitor for converting a ripple of the electronic wave screened by the screening unit into a direct current; and a consuming unit including hand-operated devices for consuming the direct current rectified by the rectifying unit.

2. The apparatus of claim 1, wherein the screening unit comprises a plurality of conductors where at least two kinds of conductive materials having different conductivity are connected in series or parallel.

3. The apparatus of claim 1, wherein the rectifying unit is spread with a conductive material by deposition or blasting, and is used as a screening or rectifying electrode.

* * * * *